United States Patent
Au et al.

(10) Patent No.: US 10,990,769 B1
(45) Date of Patent: Apr. 27, 2021

(54) METHODS AND SYSTEMS FOR IMPROVED TAG IDENTIFICATION

(71) Applicant: Hand Held Products, Inc., Fort Mill, SC (US)

(72) Inventors: Ka Man Au, Philadelphia, PA (US); Charles Joseph Cunningham, IV, Broomall, PA (US); Michael J. Wells, Lake Stevens, WA (US); Abhay Ravi Chandran, Aberdeen, MD (US); Rodney W. Chinn, Redmond, WA (US); Shashidhar Ramamurthy, Seattle, WA (US); Christopher T. Bouchat, Waxhaw, NC (US); Rene Martinez, Seattle, WA (US); Michael V. Miraglia, Hamilton, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 16/832,635

(22) Filed: Mar. 27, 2020

(51) Int. Cl.
*G06K 7/08* (2006.01)
*G06K 7/10* (2006.01)

(52) U.S. Cl.
CPC ..... *G06K 7/10128* (2013.01); *G06K 7/10396* (2013.01)

(58) Field of Classification Search
CPC ...... G06N 20/00; H04L 67/12; G05B 13/028; G05B 19/4183; G05B 19/4184
USPC .......... 235/451, 492, 462.44, 462.46, 472.02
See application file for complete search history.

(56) References Cited

U.S. PATENT DOCUMENTS

| | | | |
|---|---|---|---|
| 6,732,932 B2* | 5/2004 | Schuessler | G06K 19/06028 235/462.07 |
| 6,732,934 B2 | 5/2004 | Hamilton et al. | |
| 9,959,439 B1* | 5/2018 | Lui | G06Q 10/087 |
| 2009/0012882 A1* | 1/2009 | Sarangapani | G06Q 10/087 705/28 |
| 2012/0161968 A1 | 6/2012 | Bodapati | |
| 2013/0194078 A1 | 8/2013 | Bohnenberger et al. | |
| 2014/0244207 A1* | 8/2014 | Hicks | G01C 3/00 702/150 |
| 2015/0356667 A1* | 12/2015 | Poole | G06Q 30/0635 705/26.81 |

* cited by examiner

*Primary Examiner* — Daniel St Cyr
(74) *Attorney, Agent, or Firm* — Alston & Bird LLP (57) ABSTRACT

Apparatuses, systems, and methods of manufacturing are described that provide improved tag identification. An example system includes a radio-frequency identification (RFID) scanner that receives a stream of RFID tags each associated with a respective article. The system further includes a first sensor attached to the RFID scanner that generates first positional data and a second sensor positioned separate from the first sensor that generates second positional data. The system also includes a computing device communicably coupled with the RFID scanner, the first sensor, and the second sensor. The computing device receives the stream of RFID tags, receives first positional data from the first sensor, receives second positional data from the second sensor, and determines an intended RFID tag from amongst the stream of RFID tags based upon the first positional data and the second positional data.

20 Claims, 7 Drawing Sheets

METHODS AND SYSTEMS FOR IMPROVED TAG IDENTIFICATION

TECHNOLOGICAL FIELD

Example embodiments of the present invention relate generally to scanning systems and, more particularly, to methods and systems for improved tag identification.

BACKGROUND

Warehouses, distribution centers, and other material handling environments often rely on a number of components, systems, and the like for transporting products, articles, items, etc. to and from various locations within these environments. In some instances, human operators or users are responsible for picking, moving, and sorting these articles and may require assistance to identify articles for picking. The inventors have identified numerous deficiencies with these existing technologies in the field, the remedies for which are the subject of the embodiments described herein.

BRIEF SUMMARY

As noted above, traditional warehouses and distribution centers may rely upon human operators to perform various tasks in these material handling environments. In some instances, these operators may be equipped with scanning devices configured to facilitate their actions by providing information (e.g., current location, item code, article destination, etc.) regarding tagged articles. For example, some operators employ barcode scanners configured to scan a barcode located on an article (e.g., item, product, etc.) that the operator intends to pick or otherwise handle. Barcode scanners, however, require line-of-sight (LOS) between the scanning device and the barcode located on the article in order to receive information (e.g., data) associated with this article. Radio-frequency identification (RFID) tags, however, operate using electromagnetic fields such that LOS between the RFID tag located on the article and the RFID scanner is unnecessary. Although RFID systems do not require LOS, an operator equipped with an RFID scanner may approach a plurality of articles in close proximity each of which include a respective RFID tag. As such, the RFID scanner of the operator may receive RFID tag data from the plurality of articles resulting in erroneous instructions to the operator.

To solve these issues and others, example implementations of embodiments of the present invention may utilize a first sensor attached to the RFID scanner and a second sensor separate from the RFID scanner (e.g., attached to a portable data terminal (PDT)) in order to accurately identify an intended RFID tag. Embodiments of the present disclosure may employ accelerometers, gyroscopes, and related positional sensors in order to determine relative acceleration and tilt between a user's hand (e.g., supporting the RFID scanner) and the user's torso (e.g., supporting the PDT). The net rotation and net acceleration may be used to determine a pick operation (e.g., when a user grabs an item) and determine an intended RFID tag that corresponds with the pick operation. Furthermore, embodiments of the present disclosure may also utilize time data and signal strength data associated with the received RFID tags in order to further improve the accuracy of intended RFID tag determinations. In doing so, such example implementations reliably identify intended RFID tags resulting in efficient operator workflows with reduced down time.

Apparatuses, systems, and associated computer program products are provided for improved tag identification. An example scanning system may include a radio-frequency identification (RFID) scanner configured to receive a stream of RFID tags, wherein each RFID tag is associated with a respective article. The system may further include a first sensor attached to the RFID scanner and configured to generate first positional data and a second sensor positioned separate from the first sensor and configured to generate second positional data. The system may further include a computing device communicably coupled with the RFID scanner, the first sensor, and the second sensor. The computing device may be configured to receive the stream of RFID tags, receive first positional data from the first sensor, receive second positional data from the second sensor; and determine an intended RFID tag from amongst the stream of RFID tags based upon the first positional data and the second positional data.

In some embodiments, the first sensor may be positioned on a user's hand.

In some embodiments, the second sensor may be positioned on the user's torso.

In some embodiments, the first positional data may include first rotational data associated with the user's hand, and the second positional data may include second rotational data associated with the user's torso. In such an embodiment, the computing device may be further configured to subtract the second rotational data from the first rotational data and determine a net rotation of the first sensor relative to the second sensor. The computing device may also be configured to determine a pick operation in an instance in which the net rotation satisfies a rotation threshold; and determine the intended RFID tag that corresponds with the pick operation.

In some embodiments, first positional data may include first acceleration data associated with the user's hand, and the second positional data may include second acceleration data associated with the user's torso. In such an embodiment, the computing device may be further configured to subtract the second acceleration data from the first acceleration data and determine a net acceleration of the first sensor relative to the second sensor. The computing device may also be configured to determine a pick operation in an instance in which the net acceleration satisfies an acceleration threshold and determine the intended RFID tag that corresponds with the pick operation.

In some further embodiments, each RFID tag in the stream may include tag time data, the first positional data may include first time data, and the second positional data may include second time data. In such an embodiment, the computing device may be configured to generate an intended time window based upon the tag time data and analyze first positional data and second positional data having first time data and second time data, respectively, within the intended time window.

In some embodiments, the computing device may be further configured to analyze the intended RFID tag and generate a user notification based upon the intended RFID tag.

In some embodiments, the computing device may further receive signal strength data for each RFID tag in the stream and determine the intended RFID tag from amongst the stream of RFID tags based upon the first positional data, the second positional data, and the signal strength data.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a scanning system as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

Figure 1:
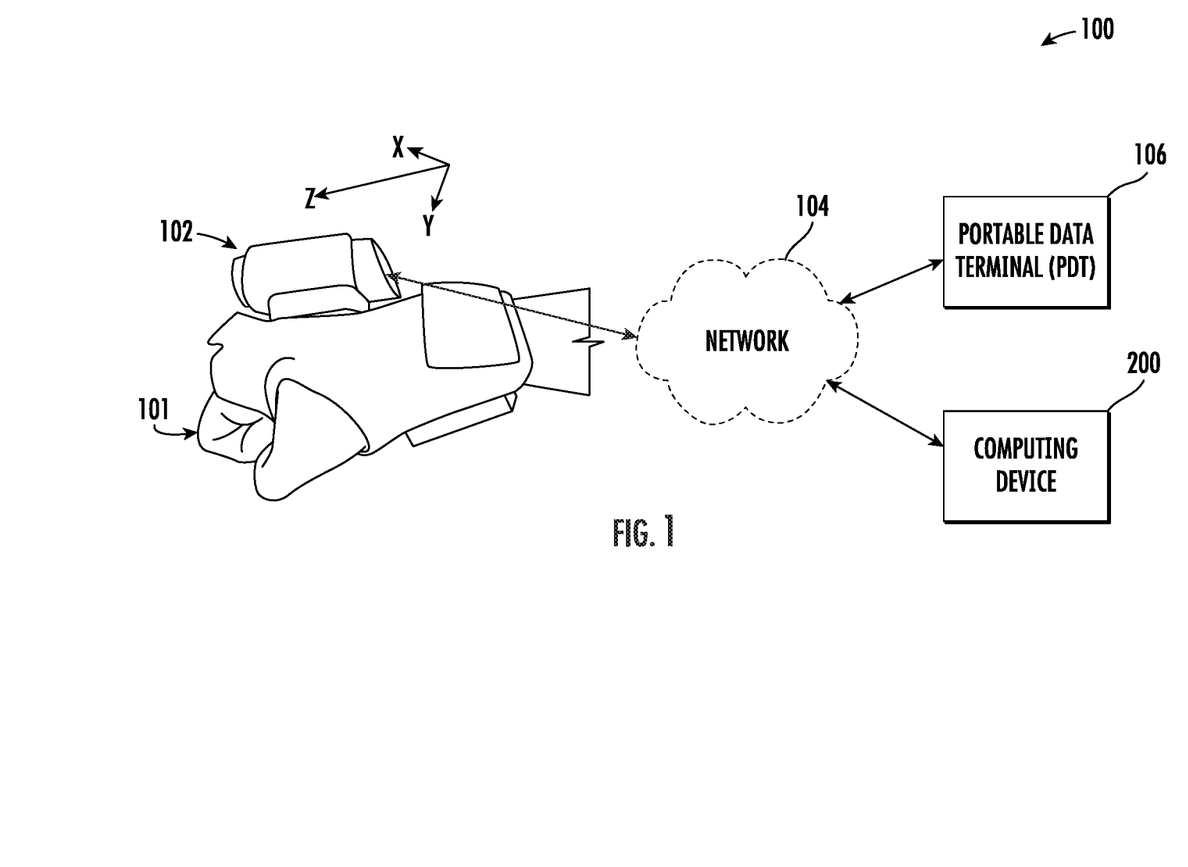
FIG. 1 illustrates a scanning system diagram including devices that may be involved in some example embodiments described herein.

As used herein, the terms "scanning system," "scanner," "scanning device," and the like refer to devices and associated computer hardware that is configured (either physically or by the execution of software) to gather information from a tagged article. By way of example, the scanning system 100 of the present application may include a radio-frequency identification (RFID) scanner or reader configured to receive a stream of RFID tags each associated with a respective article. In some embodiments, the scanning system, scanner, or scanning device may include a "smart device" that is equipped with chip of other electronic device that is configured to communicate with a portable data terminal (PDT), computing device, or the like via Bluetooth, NFC, Wi-Fi, 3G, 4G, 5G protocols, and the like. In some embodiments, the RFID scanner may be configured to be worn attached to a user's hand 101 as illustrated in FIG. 1.

As used herein, the term "portable data terminal (PDT)," refers to any object, device, or system which may be in network communication with the scanning device (e.g., RFID scanner) and/or the computing device 200 described hereafter. For example, the PDT may refer to a wireless electronic device configured to interact with various other devices that includes a data collection function (e.g., barcode or RFID reader data collection). The PDT may be configured to communicate with a RFID scanner, computing device, or the like via Bluetooth, NFC, Wi-Fi, 3G, 4G, 5G protocols, and the like.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example scanning system 100 is illustrated with a RFID scanner 102 worn on a user's hand 101 and communicably connected via a network 104 to a portable data terminal (PDT) 106, and a computing device 200. Although the example scanning system 100 is illustrated connected via a network 104, the present disclosure contemplates that, in some embodiments, the RFID scanner 102, the PDT 106, and/or the computing device 200 may be in direct connection (e.g., physically connected). Furthermore, the present disclosure contemplates that, in some embodiments, the RFID scanner 102 or the PDT 106 may comprise the computing device 200, or a portion thereof.

The RFID scanner 102 may include circuitry, processors, chipsets, radio transponders, radio receivers, transmitters, and the like configured to receive RFID tag data from RFID tags located proximate the RFID scanner. In particular, the RFID scanner 102 may be configured to generate and transmit an electromagnetic interrogation pulse configured to cause proximate RFID tags to transmit RFID tag data to the RFID scanner 102. The RFID scanner 102 may be configured to receive a stream of RFID tags (e.g., RFID tag data) where each RFID tag is associated with a respective article. Furthermore, the RFID scanner 102 may be configured to operate with passive RFID tags (e.g., RFID tags powered from the RFID scanner's interrogation pulse) as well as active RFID tags (e.g., RFID tags with independent power sources). Although illustrated affixed atop of a user's hand 101, the RFID scanner 102 may also be configured to, in operation, attached to a user's palm, wrist, arm, or the like.

The RFID scanner 102 may further include first sensors (e.g., positional sensors) configured to generate first positional data. By way of example, the RFID scanner 102 may include one or more gyroscopes or other rotational sensors configured to generate first rotational data associated with the user's hand. The RFID scanner 102 may further include one or more accelerometers or equivalent sensors configured to generate first acceleration data associated with the user's hand. Although described herein with reference to gyroscopes and accelerometers, the present disclosure contemplates that the RFID scanner 102 may include any sensor (e.g., proximity sensors, position transducers, resolvers, encoders, rotary sensors, or the like) based upon the intended application of the sensing system 100.

The PDT 106 may include second sensors (e.g., positional sensors) configured to generate second positional data in addition to circuitry needed to operably connect the PDT 106 with the RFID scanner 102, and the computing device 200 as described above. By way of example, the PDT 106 may include one or more gyroscopes or other rotational sensors configured to generate second rotational data associated with the user's torso. The PDT 106 may further include one or more accelerometers or equivalent sensors configured to generate second acceleration data associated with the user's torso. Although described herein with reference to gyroscopes and accelerometers, the present disclosure contemplates that the PDT 106 may include any sensor (e.g., proximity sensors, position transducers, resolvers, encoders, rotary sensors, or the like) based upon the intended application of the sensing system 100.

The computing device 200 may include circuitry, networked processors, or the like configured to perform some or all of the apparatus-based (e.g., scanning system-based) processes described herein, and may be any suitable processing device and/or network server. In this regard, the computing device 200 may be embodied by any of a variety of devices. For example, the computing device 200 may be configured to receive/transmit data (e.g., RFID tag data, first positional data, and/or second positional data) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the computing device 200 may be located remotely from the RFID scanner 102 and/or the PDT 106, although in other embodiments, the RFID scanner 102 and/or the PDT 106 may comprise the computing device 200 in whole or in part. The computing device 200 may, in some embodiments, comprise several servers or computing devices performing interconnected and/or distributed functions. Despite the many arrangements contemplated herein, the computing device 200 is shown and described herein as a single computing device to avoid unnecessarily overcomplicating the disclosure. In some embodiments, one or more components of the computing device 200 may be wholly or partially housed within one or more of the RFID scanner 102 or the PDT 106.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

Figure 2:
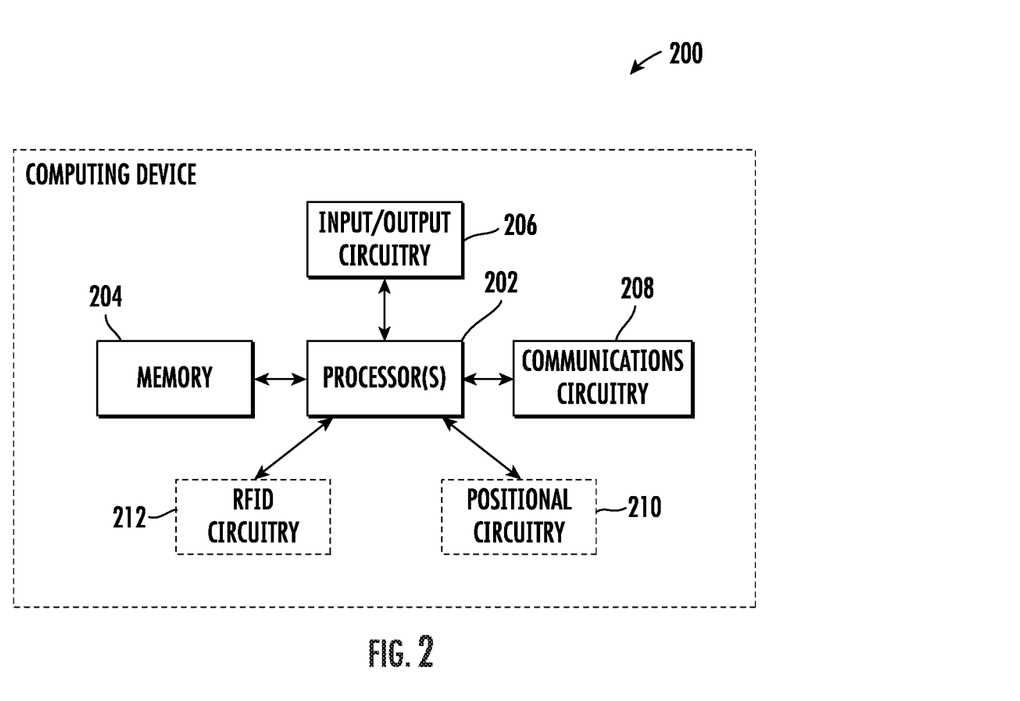
FIG. 2 illustrates a schematic block diagram of example circuitry that may perform various operations, in accordance with some example embodiments described herein.

As illustrated in FIG. 2, the computing device 200 may include a processor 202, a memory 204, input/output circuitry 206, and communications circuitry 208. Moreover, the computing device 200 may include RFID circuitry 212 and/or positional circuitry 210. The computing device 200 may be configured to execute the operations described below in connection with FIGS. 3-6. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 200 may be housed within one or more of the RFID scanner 102 and the PDT 106. It will be understood in this regard that some of the components described in connection with the computing device 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device 200 to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality including a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

RFID circuitry 212 includes hardware components designed to receive a stream of radio-frequency identification (RFID) tags, wherein each RFID tag is associated with a respective article. The RFID circuitry 212 may be housed in whole or in part within the RFID scanner 102, the PDT 106, and or the computing device 200. The RFID circuitry 212 may utilize processing circuitry, such as the processor 202, to perform its corresponding operations, and may utilize memory 204 to store collected information.

Positional circuitry 210 includes hardware components designed to analyze positional data generate by the first sensor(s) and the second sensor(s). Positional circuitry 210 may utilize processing circuitry, such as the processor 202, to perform its corresponding operations, and may utilize memory 204 to store collected information. The positional circuitry 210 may be housed in whole or in part within the RFID scanner 102, the PDT 106, and or the computing device 200. In some instances, the positional circuitry 210 may be configured to, based upon first rotational data and second rotational data from the first sensor and second sensor, respectively, determine a net rotation of the first sensor relative to the second sensor and determine a pick operation in an instance in which the net rotation satisfies a rotation threshold. Similarly, the positional circuitry 210 may be configured to, based upon first acceleration data and second acceleration data from the first sensor and second sensor, respectively, determine a net acceleration of the first sensor relative to the second sensor and determine a pick operation in an instance in which the net acceleration satisfies an acceleration threshold.

It should also be appreciated that, in some embodiments, the RFID circuitry 212 and/or the positional circuitry 210 may include a separate processor, specially configured field programmable gate array (FPGA), or application specific interface circuit (ASIC) to perform its corresponding functions.

In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of computing device 200.

As described above and as will be appreciated based on this disclosure, embodiments of the present invention may be configured as scanning systems, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Improved Tag Identification

Figure 3:
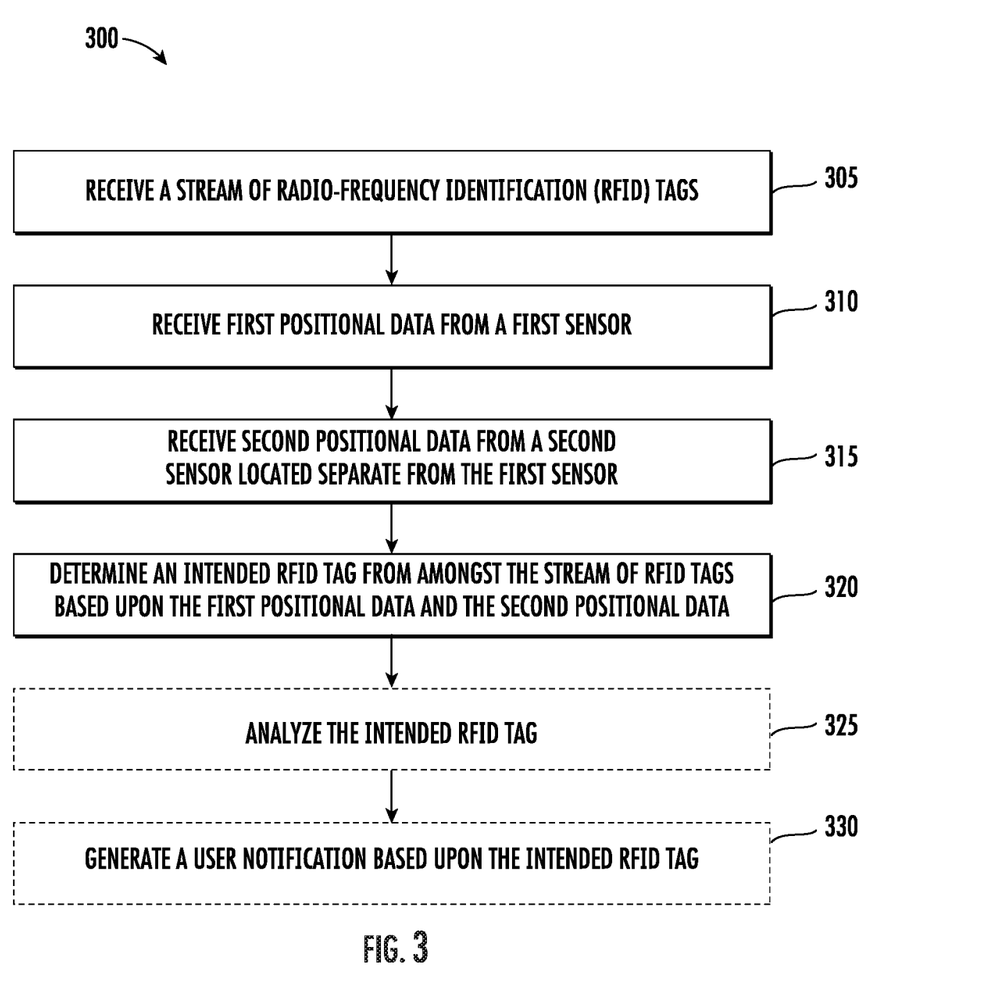
FIG. 3 illustrates an example flowchart for improved tag identification, in accordance with some example embodiments described herein.

FIG. 3 illustrates a flowchart containing a series of operations for improved tag identification. The operations illustrated in FIG. 3 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, RFID circuitry 212, and/or positional circuitry 210.

As shown in operation 305, the apparatus (e.g., scanning system 100 and/or computing device 200) includes means, such as input/output circuitry 206, communications circuitry 208, RFID circuitry 212, or the like, for receiving a stream of radio-frequency identification (RFID) tags. As described above, the warehouse or other material handling environment may include a plurality of articles each of which includes an RFID tag attached thereto. Due to the close proximity of these articles, the RFID scanner 102 may receive a stream of RFID tags each of which is associated with a respective article at operation 305. In some embodiments, as described hereafter with reference to FIG. 6, each of the RFID tags in the stream may be timestamped (e.g., include tag time data) indicative of the time at which the RFID tag received an interrogation signal from the RFID scanner 102. In some embodiments, the RFID tags (e.g., RFID tag data) and/or tag time data may be stored by the RFID scanner 102. In other embodiments, the RFID scanner may transmit the RFID tag data and/or tag time data to the computing device 200 and/or PDT 106 for further processing as described hereafter.

As shown in operation 310, the apparatus (e.g., scanning system 100 and/or computing device 200) includes means, such as input/output circuitry 206, communications circuitry 208, positional circuitry 210, or the like, for receiving first positional data from a first sensor. As described above, in some embodiments, the first sensor may be housed by the RFID scanner 102 and, in operation, may be positioned on a user's hand. In this way, the first sensor of the RFID scanner 102 may be configured to generate first positional data indicative of the position, location, velocity, tilt, etc. of the RFID scanner 102. By way of example and as described hereafter with reference to FIG. 4, the first sensor may comprise a gyroscope or other rotational sensor such that the first positional data comprises first rotational data associated with the RFID scanner 102 (e.g., and user's hand). By way of an additional example and as described hereafter with reference to FIG. 5, the first sensor may comprise an accelerometer or other equivalent sensor such that the first positional data comprises first acceleration data associated with the RFID scanner 102 (e.g., and user's hand).

As shown in operation 315, the apparatus (e.g., scanning system 100 and/or computing device 200) includes means, such as input/output circuitry 206, communications circuitry 208, positional circuitry 210, or the like, for receiving second positional data from a second sensor located separate from the first sensor. As described above, in some embodiments, the second sensor may be housed by the PDT 106 and, in operation, may be positioned on a user's torso. In any event, the second sensor may be positioned separate from the first sensor so as to provide an independent source of positional data (e.g., associated with the user but distinct from the RFID scanner 102). In this way, the second sensor of the PDT 106 may be configured to generate second positional data indicative of the position, location, velocity, tilt, etc. of the user's torso. By way of example and as described hereafter with reference to FIG. 4, the second sensor may comprise a gyroscope or other rotational sensor such that the second positional data comprises second rotational data associated with the PDT 106 (e.g., and user's torso). By way of an additional example and as described hereafter with reference to FIG. 5, the second sensor may comprise an accelerometer or other equivalent sensor such that the second positional data comprises second acceleration data associated with the PDT 106 (e.g., and user's torso).

As shown in operation 315, the apparatus (e.g., scanning system 100 and/or computing device 200) includes means, such as input/output circuitry 206, communications circuitry 208, RFID circuitry 212, positional circuitry 210, or the like, for determining an intended RFID tag from amongst the stream of RFID tags based upon the first positional data and the second positional data. As described further hereafter with reference to FIGS. 4-6, the scanning system and/or computing device 200 may analyze the first positional data from the first sensor and the second positional data from the second sensor to determine an intended RFID tag from amongst the stream of RFID tags received at operation 305. By way of example, a user may be equipped with the RFID scanner 102 located on the user's hand. The user may approach a plurality of articles each associated with respective RFID tags, and the RFID scanner 102 may receive a stream of RFID tags (e.g., RFID tag data) from the plurality of articles. As described with reference to operation 310, the scanning system 100 may receive first positional data from the first sensor indicative of the position of the user's hand. As described with reference to operation 315, the scanning system 100 may receive second positional data from the second sensor indicative of the position of the user's torso.

Although the first positional data may indicate the position of the RFID scanner 102 and user's hand, the first positional data alone may not be indicative of the RFID scanner 102 and user's hand performing a picking operation. Said differently, a user's hand may be located proximate many articles at times that coincide with RFID tag data received by the scanning system 100 and/or computing device 200. As such, the scanning system 100 described herein may rely upon the first positional data from the first sensor in conjunction with the second positional data of the second sensor (e.g., positioned at the user's torso) in order to determine a pick operation as described hereafter with reference to FIGS. 4-5. In some embodiments, the scanning system 100 may use the second positional data indicative of the position of the user's torso to determine the net positional data (e.g., difference between the first positional data and the second positional data) in order to identify a pick operation. For example, first acceleration data of the RFID scanner 102 and user's arm alone may indicate that the user is moving his or her arm to pick an article. However, second acceleration of the PDT 106 and second sensor may indicate that the user is also moving (e.g., walking or running). In such an embodiment, the net acceleration may indicate that a pick operation is not occurring.

In some embodiments, as shown in operation 325, the apparatus (e.g., scanning system 100 and/or computing device 200) includes means, such as input/output circuitry 206, communications circuitry 208, RFID circuitry 212, or the like, for analyzing the intended RFID tag. For example, the RFID circuitry 212 may identify or receive the intended RFID tag from the stream of RFID tags and analyze the intended RFID tag to determine one or more characteristics of the article associated with the intended RFID tag. In some embodiments, the intended RFID tag, when received by the RFID scanner 102, may include various characteristics of the associated article (e.g., product type, current location, destination location, etc.). In other embodiments, the intended RFID tag may include identifying information (e.g., product code, item number, etc.) such that the scanning system 100 (e.g., computing device 200) may query an article database (not shown) storing one or more characteristics the article associated with the intended RFID tag.

As shown in operation 330, the apparatus (e.g., scanning system 100 and/or computing device 200) includes means, such as input/output circuitry 206, communications circuitry 208, RFID circuitry 212, or the like, for generating a user notification based upon the intended RFID tag. For example, the scanning system 100 may determine the intended RFID tag and analyze the intended RFID tag at operations 320 and 325, respectively, to identify one or more characteristics of the intended RFID tag. The communications circuitry 208 and/or input/output circuitry 206 of the computing device 200 may generate a user notification displaying or more characteristics of the intended RFID tag. By way of example, the intended RFID tag may include destination characteristics indicative of a next or final position of the article associated with the intended RFID tag. As such, the user may grab the article, the scanning system may perform the operations described above (e.g., operations 305-320), and may present a visual or audio notification to the user indicative of the destination of the article associated with the intended RFID tag (e.g., move article to shuttle A). Although described herein with reference to a destination location, the present disclosure contemplates that any characteristic of the article associated with the intended RFID tag may be presented to the user based upon the intended application of the scanning system 100.

Figure 4:
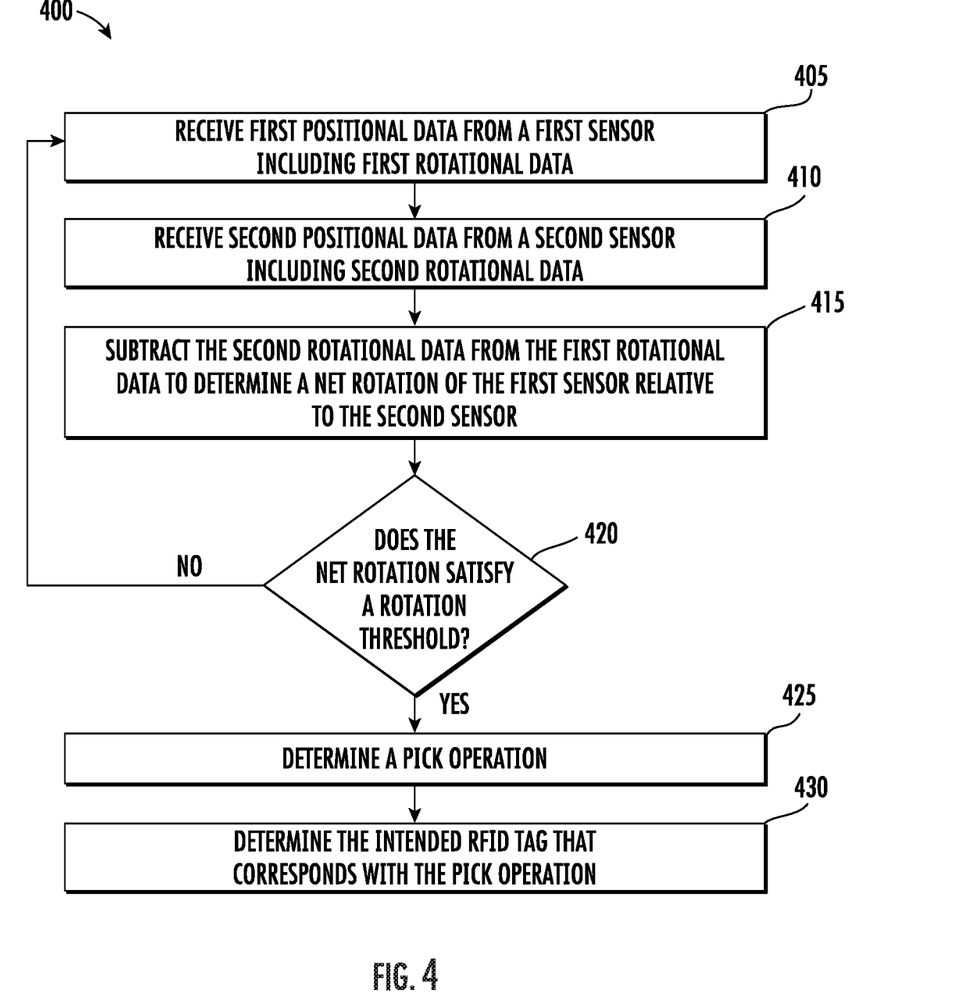
FIG. 4 illustrates an example flowchart for net rotation determinations, in accordance with some example embodiments described herein.

FIG. 4 illustrates a flowchart containing a series of operations for net rotation determinations. The operations illustrated in FIG. 4 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, RFID circuitry 212, and/or positional circuitry 210.

As shown in operation 405, the apparatus (e.g., scanning system 100 and/or computing device 200) includes means, such as input/output circuitry 206, communications circuitry 208, positional circuitry 210, or the like, for receiving first positional data from the first sensor including first rotational data. As described above, in some embodiments, the first sensor may be housed by the RFID scanner 102 and, in operation, may be positioned on a user's hand. In this way, the first sensor of the RFID scanner 102 may be configured to generate first positional data indicative of the rotational position, tilt, or the like of the RFID scanner 102. In particular, the first sensor may comprise a gyroscope or other rotational sensor such that the first positional data comprises first rotational data associated with the RFID scanner 102 (e.g., and user's hand). By way of example, a user may attempt to hold, grab, etc. an article by grasping the sides (e.g., vertical sides) of the article. In such an example, the first rotational data from the first sensor (e.g., housed with the RFID scanner 102) may indicate that the force of gravity exists in the X-Z plane indicating that the user's hand is located on a vertical surface of the article. Furthermore, in an instance in which the total gravitational force detected by the first sensor (e.g., gyroscope, accelerometer, or the like) exceeds 1.0 g, the first rotational sensor data may be indicative of the user lifting the article.

As shown in operation 410, the apparatus (e.g., scanning system 100 and/or computing device 200) includes means, such as input/output circuitry 206, communications circuitry 208, positional circuitry 210, or the like, for receiving second positional data from a second sensor including second rotational data. As described above, in some embodiments, the second sensor may be housed by the PDT 106 and, in operation, may be positioned on a user's torso. In any event, the second sensor may be positioned separate from the first sensor so as to provide an independent source of positional data (e.g., associated with the user but distinct from the RFID scanner 102). In this way, the second sensor of the PDT 106 may be configured to generate second positional data indicative of the rotational position, tilt, or the like of the user's torso. The second sensor may comprise a gyroscope or other rotational sensor such that the second positional data comprises second rotational data associated with the PDT 106 (e.g., and user's torso).

As shown in operation 415, the apparatus (e.g., scanning system 100 and/or computing device 200) includes means, such as input/output circuitry 206, communications circuitry 208, positional circuitry 210, or the like, for subtracting the second rotational data from the first rotational data to determine a net rotation of the first sensor relative to the second sensor. As described above, in some embodiment, reliance upon the first rotational data of the first sensor housed by the RFID scanner 102 may be insufficient to identify instances in which a user is performing a pick operation. By way of example, the first rotational data may indicate that the user hand (e.g., RFID scanner 102) is located at 90 degrees such that the user may be resting his or her hand on a vertical surface of an article. Due to the varying slopes, levels, etc. in a material handling environment, however, the user's hand (e.g., RFID scanner 102) may instead be located at 90 degrees with respect to a sloped surface (e.g., ramp, conveyor, etc.) but not 90 degrees with respect to the user's body (e.g., torso). As such, the scanning system 100 may subtract the second rotational data (e.g., from the PDT 106) from the first rotational data (e.g., RFID scanner 102) to determine the net rotation of the first sensor (e.g., RFID scanner 102) relative to the second sensor (e.g., PDT 106). Said differently, the net rotation may more accurately indicate instances in which the user grips the vertical side of an article.

As shown in operations 420 and 425, the apparatus (e.g., scanning system 100 and/or computing device 200) includes means, such as input/output circuitry 206, communications circuitry 208, positional circuitry 210, or the like, for determining a pick operation in an instance in which the net rotation satisfies a rotation threshold. The scanning system 100 and computing device 200 may employ one or more rotation thresholds indicative of a user performing a pick operation (e.g., grasping an article). By way of example, the rotation threshold may include a net rotation range of between approximately 85 degrees and 95 degree with respect to the PDT 106 (e.g., the second sensor). In such an example, a net rotation that falls within the range would satisfy the rotation threshold and indicate that the user is performing a pick operation (e.g., positioning his or her hands to grasp a vertical surface of the article). Although described herein with reference to a rotational range, the present disclosure contemplates that any rotation threshold based upon gravitational force, angular velocity, or the like may be used based upon the intended application of the scanning system 100.

In response to determining a pick operation at operation 425, the apparatus (e.g., scanning system 100 and/or computing device 200) includes means, such as input/output circuitry 206, communications circuitry 208, RFID circuitry 212, positional circuitry 210, or the like, for determining the intended RFID tag that corresponds with the pick operation at operation 430. As described above, the stream of RFID tags may be timestamped (e.g., include tag time data) indicative of the time at which the RFID tag received an interrogation signal from the RFID scanner 102. In some embodiments, the RFID tags (e.g., RFID tag data) and/or tag time data may be stored by the RFID scanner 102. In other embodiments, the RFID scanner may transmit the RFID tag data and/or tag time data to the computing device 200 and/or PDT 106 for further processing as described hereafter. In order to determine the intended RFID tag, the scanning system 100 and/or computing device 200 may select the RFID tag from amongst the stream of RFID tags having a timestamp that coincides with the time of the determined pick operation. Said differently, the scanning system 100 may determine that the user is grasping the vertical side of an article (e.g. performing a pick operation) and select the RFID tag having tag time data that corresponds with this action. As described with reference to FIG. 3, the scanning system may further analyze the intended RFID tag and/or generate a notification to the user based upon the intended RFID tag.

Figure 5:
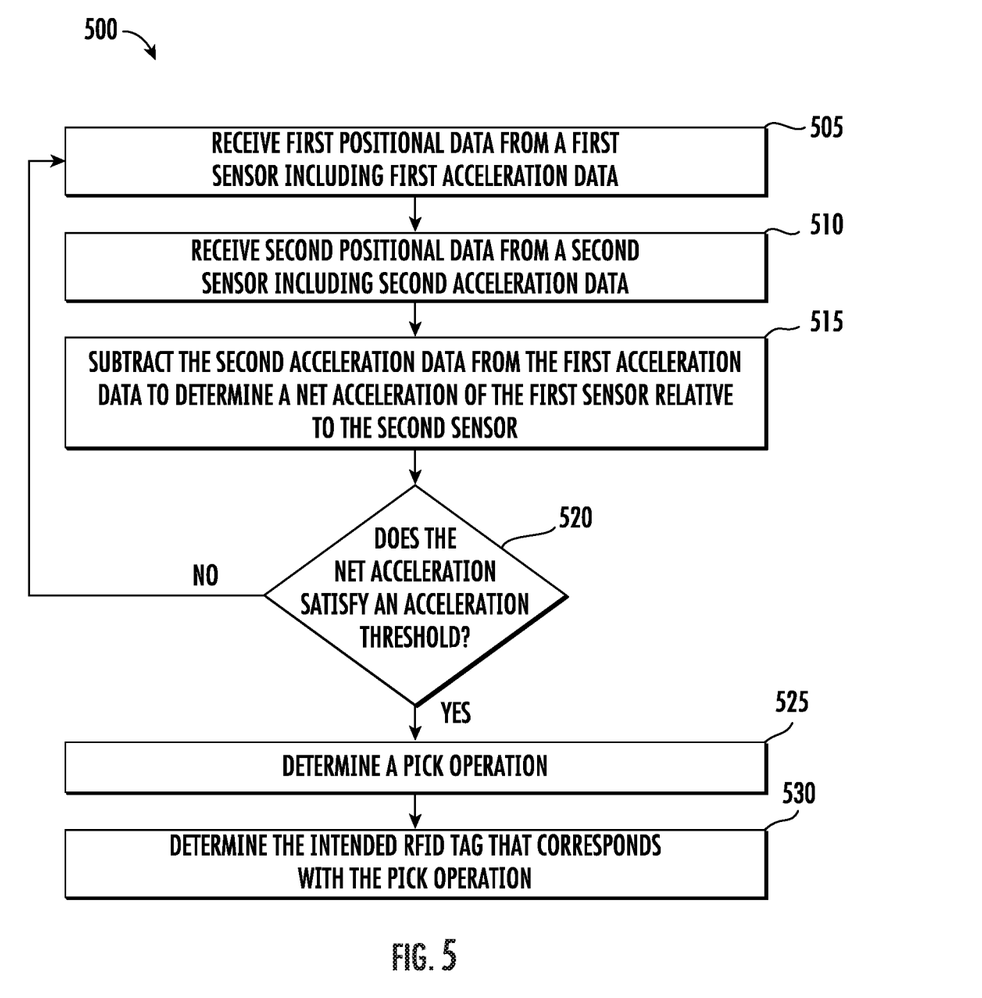
FIG. 5 illustrates an example flowchart for net acceleration determinations, in accordance with some example embodiments described herein.

FIG. 5 illustrates a flowchart containing a series of operations for net acceleration determinations. The operations illustrated in FIG. 5 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, RFID circuitry 212, and/or positional circuitry 210.

As shown in operation 505, the apparatus (e.g., scanning system 100 and/or computing device 200) includes means, such as input/output circuitry 206, communications circuitry 208, positional circuitry 210, or the like, for receiving first positional data from the first sensor including first acceleration data. As described above, in some embodiments, the first sensor may be housed by the RFID scanner 102 and, in operation, may be positioned on a user's hand. In this way, the first sensor of the RFID scanner 102 may be configured to generate first positional data indicative of the acceleration, velocity, or the like of the RFID scanner 102. In particular, the first sensor may comprise an accelerometer or other equivalent sensor such that the first positional data comprises first acceleration data associated with the RFID scanner 102 (e.g., and user's hand). By way of example, a user may attempt to hold, grab, etc. an article by moving his or her hand from the user's torso to a position to grasp the sides (e.g., vertical sides) of the article. In such an example, the first acceleration data from the first sensor (e.g., housed with the RFID scanner 102) may indicate that the user's hand (e.g., RFID scanner 102) is accelerating away from the user's body.

As shown in operation 510, the apparatus (e.g., scanning system 100 and/or computing device 200) includes means, such as input/output circuitry 206, communications circuitry 208, positional circuitry 210, or the like, for receiving second positional data from a second sensor including second acceleration data. As described above, in some embodiments, the second sensor may be housed by the PDT 106 and, in operation, may be positioned on a user's torso. In any event, the second sensor may be positioned separate from the first sensor so as to provide an independent source of positional data (e.g., associated with the user but distinct from the RFID scanner 102). In this way, the second sensor of the PDT 106 may be configured to generate second acceleration data indicative of the acceleration, velocity, or the like of the user's torso. The second sensor may comprise an accelerometer or other equivalent sensor such that the second positional data comprises second acceleration data associated with the PDT 106 (e.g., and user's torso).

As shown in operation 515, the apparatus (e.g., scanning system 100 and/or computing device 200) includes means, such as input/output circuitry 206, communications circuitry 208, positional circuitry 210, or the like, for subtracting the second acceleration data from the first acceleration data to determine a net acceleration of the first sensor relative to the second sensor. As described above, in some embodiment, reliance upon the first acceleration data of the first sensor housed by the RFID scanner 102 may be insufficient to identify instance in which a user is performing a pick operation. By way of example, the first acceleration data may indicate that the user hand (e.g., RFID scanner 102) is accelerating from the user's torso to grasp a vertical surface of an article. Due to the movement of the user about the material handling environment, however, the user's hand (e.g., RFID scanner 102) may instead be accelerating from the user's torso while the user's torso is also accelerating (e.g., the user is walking, running, or otherwise moving). As such, the scanning system 100 may subtract the second acceleration data (e.g., from the PDT 106) from the first acceleration data (e.g., RFID scanner 102) to determine the net acceleration of the first sensor (e.g., RFID scanner 102)

relative to the second sensor (e.g., PDT 106). Said differently, the net acceleration may more accurately indicate instances in which the user hand is moving from the user's torso so as to grip the vertical side of an article.

The present disclosure contemplates that the subtract of acceleration data described with reference to operation 515 may refer to subtraction of a portion of the second acceleration data from the first acceleration data. In particular, second acceleration data from the second sensor may include low frequency component data that, when removed or subtracted from the first acceleration data, improves the quality of the first acceleration data. Said differently, low frequency component data of the second sensor may, in some embodiments, represent movement of the user's entire body (e.g., when the second sensor is positioned on the operator's torso) such that this low frequency component data likely represents movement of both the first sensor and the second sensor. As such, by removing this low frequency component data associated with the movement of the first sensor and the second sensor, the first acceleration data may more accurately represent the acceleration of the first sensor.

As shown in operation 520 and 525, the apparatus (e.g., scanning system 100 and/or computing device 200) includes means, such as input/output circuitry 206, communications circuitry 208, positional circuitry 210, or the like, for determining a pick operation in an instance in which the net acceleration satisfies an acceleration threshold. The scanning system 100 and computing device 200 may employ one or more acceleration thresholds indicative of a user performing a pick operation (e.g., grasping an article). By way of example, the acceleration threshold may include a net acceleration range of between approximately 3 m/s$^2$ and 5 m/s$^2$ with respect to the PDT 106 (e.g., the second sensor). In such an example, a net acceleration that falls within the range would satisfy the acceleration threshold and indicate that the user is performing a pick operation (e.g., positioning his or her hands to grasp a vertical surface of the article). Although described herein with reference to an acceleration range, the present disclosure contemplates that any acceleration threshold based upon gravitational force, angular velocity, or the like may be used based upon the intended application of the scanning system 100.

As described above, in response to determining a pick operation at operation 525, the apparatus (e.g., scanning system 100 and/or computing device 200) includes means, such as input/output circuitry 206, communications circuitry 208, RFID circuitry 212, positional circuitry 210, or the like, for determining the intended RFID tag that corresponds with the pick operation at operation 530. The stream of RFID tags may be timestamped (e.g., include tag time data) indicative of the time at which the RFID tag received an interrogation signal from the RFID scanner 102. In some embodiments, the RFID tags (e.g., RFID tag data) and/or tag time data may be stored by the RFID scanner 102. In other embodiments, the RFID scanner may transmit the RFID tag data and/or tag time data to the computing device 200 and/or PDT 106 for further processing as described hereafter. In order to determine the intended RFID tag, the scanning system 100 and/or computing device 200 may select the RFID tag from amongst the stream of RFID tags having a timestamp that coincides with the time of the determined pick operation. Said differently, the scanning system 100 may determine that the user is grasping the vertical side of an article (e.g. performing a pick operation) and select the RFID tag having tag time data that corresponds with this action. As described with reference to FIG. 3, the scanning system may further analyze the intended RFID tag and/or generate a notification to the user based upon the intended RFID tag.

Figure 6:
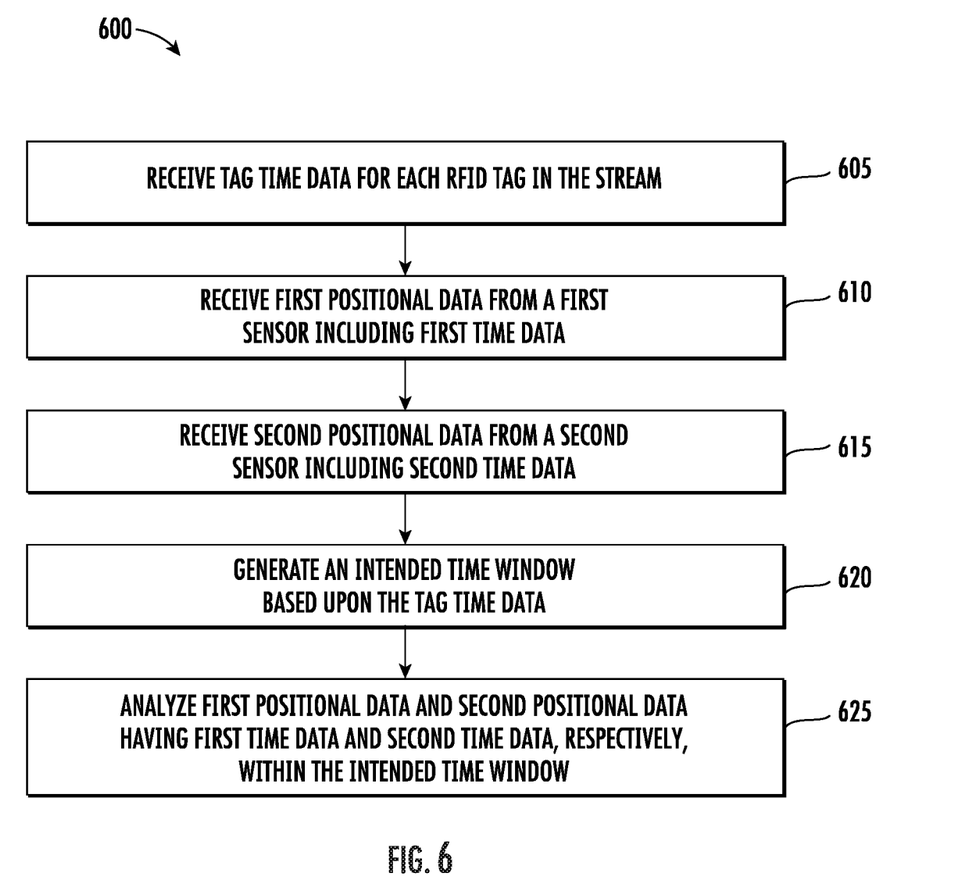
FIG. 6 illustrates an example flowchart for intended time window determinations, in accordance with some example embodiments, described herein.

FIG. 6 illustrates a flowchart containing a series of operations for intended time window determinations. The operations illustrated in FIG. 6 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, RFID circuitry 212, and/or positional circuitry 210.

As shown in operation 605, the apparatus (e.g., scanning system 100 and/or computing device 200) includes means, such as input/output circuitry 206, communications circuitry 208, positional circuitry 210, or the like, for receiving tag time data for each RFID tag in the stream. As described above, in some embodiments, each RFID tag from the stream of RFID tags may be timestamped (e.g., include tag time data) indicative of the time at which the RFID tag received an interrogation signal from the RFID scanner 102. In some embodiments, the RFID tags (e.g., RFID tag data) and/or tag time data may be stored by the RFID scanner 102. In other embodiments, the RFID scanner may transmit the RFID tag data and/or tag time data to the computing device 200 and/or PDT 106 for further processing as described hereafter.

As shown in operation 610, the apparatus (e.g., scanning system 100 and/or computing device 200) includes means, such as input/output circuitry 206, communications circuitry 208, positional circuitry 210, or the like, for receiving first positional data from a first sensor including first time data. As described above, the first sensor may be housed by the RFID scanner 102 and, in operation, may be positioned on a user's hand. In this way, the first sensor of the RFID scanner 102 may be configured to generate first positional data indicative of the rotational position, tilt, or the like of the RFID scanner 102. In particular, the first sensor may comprise a gyroscope and/or accelerometer such that the first positional data comprises first rotational data and/or first acceleration data associated with the RFID scanner 102 (e.g., and user's hand). In some embodiments, each first positional data entry generated by the first sensor of the RFID scanner 102 and received by the computing device 200 may be timestamped (e.g., include first time data) indicative of the time at which the first positional data was generated.

As shown in operation 615, the apparatus (e.g., scanning system 100 and/or computing device 200) includes means, such as input/output circuitry 206, communications circuitry 208, positional circuitry 210, or the like, for receiving second positional data from a second sensor including second time data. Similar to the first positional data, in some embodiments, the second sensor may be housed by the PDT 106 and, in operation, may be positioned on a user's torso. In any event, the second sensor may be positioned separate from the first sensor so as to provide an independent source of positional data (e.g., associated with the user but distinct from the RFID scanner 102). In this way, the second sensor of the PDT 106 may be configured to generate second positional data indicative of the rotational position, tilt, or the like of the user's torso. The second sensor may comprise a gyroscope and/or accelerometer such that the second positional data comprises second rotational data and/or second acceleration data associated with the PDT 106 (e.g., and user's torso). In some embodiments, each second positional data entry generated by the second sensor of the PDT 106 and received by the computing device 200 may be timestamped (e.g., include second time data) indicative of the time at which the second positional data was generated.

As shown in operation 620, the apparatus (e.g., scanning system 100 and/or computing device 200) includes means, such as input/output circuitry 206, communications circuitry 208, positional circuitry 210, or the like, for generating an intended time window based upon the tag time data. As described above, each RFID tag may be associated with tag time data. Given that the scanning system 100 is concerned with improving tag identification (e.g., reducing incorrect RFID tag selection), the computing device 200 may, at operation 620, generate an intended time window by removing positional data (e.g., first positional data and second positional data) that is outside (e.g., does not correspond with) the tag time data. Said differently, the scanning system 100 may remove positional data readings that are not associated with (e.g., coincide with tag time data) timestamped RFID tags (e.g., user movement unrelated to pick operations).

In response to generating an intended time window at operation 620, the apparatus (e.g., scanning system 100 and/or computing device 200) includes means, such as input/output circuitry 206, communications circuitry 208, RFID circuitry 212, positional circuitry 210, or the like, for analyzing first positional data and second positional data having first time data and second time data, respectively, within the intended time window. As described above at operation 620, the scanning system 100 may remove positional data received from the first sensor and the second sensor outside of the intended time window to reduce false positives (e.g., positional data indicated of a pick operation but not associated with tag time data). The scanning system 100 and/or computing device 100 may utilize the operations described above with refence to FIGS. 4 and 5 to determine intended RFID tags within the intended time window.

Figure 7:
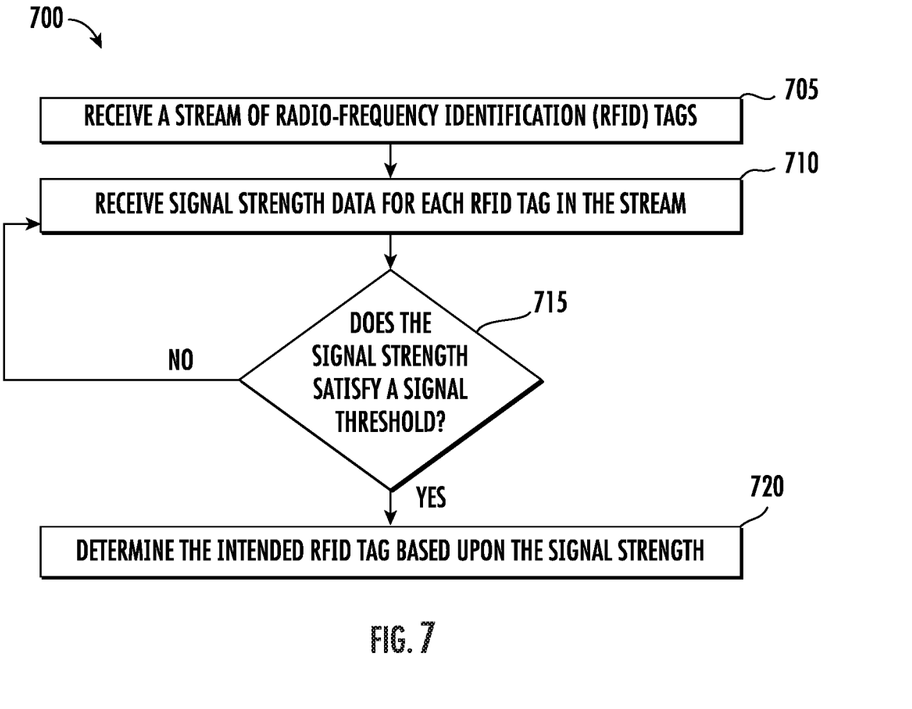
FIG. 7 illustrates an example flowchart for signal strength determinations, in accordance with some example embodiments, described herein.

FIG. 7 illustrates a flowchart containing a series of operations for signal strength determinations. The operations illustrated in FIG. 7 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, RFID circuitry 212, and/or positional circuitry 210.

As shown in operation 705, the apparatus (e.g., scanning system 100 and/or computing device 200) includes means, such as input/output circuitry 206, communications circuitry 208, RFID circuitry 212, or the like, for receiving a stream of radio-frequency identification (RFID) tags. As described above with reference to FIG. 3, the warehouse or other material handling environment may include a plurality of articles each of which includes an RFID tag attached thereto. Due to the close proximity of these articles, the RFID scanner 102 may receive a stream of RFID tags each of which is associated with a respective article at operation 705. In some embodiments, as described above with reference to FIG. 6, each of the RFID tags in the stream may be timestamped (e.g., include tag time data) indicative of the time at which the RFID tag received an interrogation signal from the RFID scanner 102. In some embodiments as described hereafter with reference to operation 710, the RFID tags may include an associated signal strength, received signal strength indicator (RSSI), or the like.

Although described hereafter with reference to signal strength determinations alone, the present disclose contemplates that signal strength data associated with the stream of RFID tags may be used in conjunction with the positional data of the first sensor (e.g., first rotational data and/or first acceleration data), the positional data of the second sensor (e.g., second rotational data and/or second acceleration data), and tag time data. Said differently, the operations described hereafter with reference to FIG. 7 may be used in conjunction with one or more of the operations described in FIGS. 3-6 to further improve intended tag determinations.

As shown in operation 710, the apparatus (e.g., scanning system 100 and/or computing device 200) includes means, such as input/output circuitry 206, communications circuitry 208, RFID circuitry 212, or the like, for receiving signal strength data for each RFID tag in the stream. As described above, an operator equipped with the RFID scanner may approach a plurality of articles in close proximity each of which include a respective RFID tag. As such, the RFID scanner of the operator may receive RFID tag data from the plurality of articles each of which is associated with a received signal strength indicator (RSSI). Although described hereafter with reference to a RSSI, the present disclosure contemplates that any indication of the signal strength associated with each RFID tag may also be used. In some embodiments, the RFID signal strength data may be stored by the RFID scanner 102. In other embodiments, the RFID scanner may transmit the signal strength data to the computing device 200 and/or PDT 106 for further processing as described hereafter. Furthermore, in some embodiments, the signal strength data may be associated with a value measured in decibels (dB), for example between 0 dB and −120 dB, such that the closer that the value of the signal strength data is to 0 dB, the stronger the signal strength.

As shown in operation 715, the apparatus (e.g., scanning system 100 and/or computing device 200) includes means, such as input/output circuitry 206, communications circuitry 208, RFID circuitry 212, or the like, for analyzing the signal strength data to determine if the signal strength of each RFID tag satisfies a signal threshold. By way of example, the scanning system 100 and/or computing device 200 may receive a stream of RFID tags that includes RFID tag data associated with three (3) distinct RFID tags. Each of the three (3) RFID tags from the stream may include an associated signal strength (e.g., signal strength data). For example, a first RFID tag may include a signal strength of −10 dB, a second RFID tag may include a signal strength of −40 dB, and a third RFID tag may include a signal strength of −50 dB. In such an example, the signal strength of the first RFID tag is the largest from amongst the plurality of RFID tag data. In some embodiments, the scanning system 100 and/or computing device 200 may determine that the RFID tag with the largest signal strength data is the intended RFID tag. In other embodiments in which a large number of RFID tags are received, for example, the system may employ one or more signal strength thresholds to determine the intended RFID tag.

With continued reference to operation 715, a signal strength threshold may be defined as −15 dB such that any signal strength data that is less than the −15 dB threshold (e.g., is farther from zero than −15 dB) fails to satisfy signal strength threshold. In an instance in which the signal strength exceeds −15 dB (e.g., is closer to zero than −15 dB) the scanning system 100 and/or the computing device may determine that the signal strength satisfies the signal strength threshold at operation 715. In some embodiments, the signal strength threshold may include a range of values within which the received signal strength must fall in order to satisfy the signal strength threshold. By way of example, an operator may be located proximate a large collection of articles each of which include an associated RFID tag. Such a large collection may result in the operator physically contacting some articles (e.g., articles not intended to be picked) while picking the intended article. Said differently, the scanning system 100 and/or computing device 200 may receive signal strength data associated with an RFID tag that is stronger than the signal strength of the intended RFID tag. As such, a signal threshold range (e.g., between −5 dB and −20 dB) may also be used to determine the intended RFID tag.

As shown in operation 720, the apparatus (e.g., scanning system 100 and/or computing device 200) includes means, such as input/output circuitry 206, communications circuitry 208, RFID circuitry 212, or the like, for determining the intended RFID tag based upon the signal strength. In response to operations 710 and 715, the scanning system 100 and/or computing device 200 may, in some embodiments, determine that the RFID tag from amongst the stream that satisfies the signal strength threshold is the intended RFID tag. In other embodiments, the scanning system 100 and/or computing device 200 may determine that the RFID tag from amongst the stream having the largest signal strength threshold is the intended RFID tag. In other embodiments, however, the scanning system 100 and/or computing device 200 may receive a plurality of RFID tag data each of which satisfy the signal strength threshold and/or are substantially the same in value. In such an example, the scanning system 100 and/or computing device 200 may be configured to utilize the methods of FIG. 3-6 in conjunction with the signal strength data to determine the intended RFID tag.

As described above, various technical challenges are surmounted via technical solutions contemplated herein. For instance, example implementations of embodiments of the present invention may utilize a first sensor attached to the RFID scanner and a second sensor separate from the RFID scanner (e.g., attached to a PDT) in order to accurately identify an intended RFID tag. Embodiments of the present disclosure may employ accelerometers, gyroscopes, and related positional sensors in order to determine relative acceleration and tilt between a user's hand (e.g., supporting the RFID scanner) and the user's torso (e.g., supporting the PDT). The net rotation and net acceleration may be used to determine a pick operation (e.g., when a user grabs an item) and determine an intended RFID tag that corresponds with the pick operation. In doing so, such example implementations reliably identify intended RFID tags resulting in efficient operator workflows with reduced down time.

FIGS. 3-7 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

The invention claimed is:

1. A method for tag identification, the method comprising:
receiving a stream of radio-frequency identification (RFID) tags, wherein each RFID tag is associated with a respective article;
receiving first positional data from a first sensor, wherein the first positional data comprises first rotational data;
receiving second positional data from a second sensor located separate from the first sensor, wherein the second positional data comprises second rotational data;
subtracting the second rotational data from the first rotational data;
determining a net rotation of the first sensor relative to the second sensor;
determining a pick operation in an instance in which the net rotation satisfies a rotation threshold; and
determining an intended RFID tag that corresponds with the pick operation.

2. The method according to claim 1, wherein, in operation, the first sensor is positioned on a user's hand.

3. The method according to claim 2, wherein, in operation, the second sensor is positioned on the user's torso.

4. The method according to claim 3, wherein the first positional data comprises first rotational data associated with the user's hand, the second positional data comprises second rotational data associated with the user's torso, and determining the intended RFID tag further comprises:
determining the intended RFID tag from amongst the stream of RFID tags based upon the first positional data and the second positional data.

5. The method according to claim 3, wherein the first positional data comprises first acceleration data associated with the user's hand, the second positional data comprises second acceleration data associated with the user's torso, and determining the intended RFID tag further comprises:
subtracting the second acceleration data from the first acceleration data;
determining a net acceleration of the first sensor relative to the second sensor;
determining the pick operation in an instance in which the net acceleration satisfies an acceleration threshold; and
determining the intended RFID tag that corresponds with the pick operation.

6. The method according to claim 1, wherein each RFID tag in the stream further comprises tag time data, the first positional data comprises first time data, the second positional data comprises second time data, and determining the intended RFID tag further comprises:
  generating an intended time window based upon the tag time data; and
  analyzing the first positional data and the second positional data having first time data and second time data, respectively, within the intended time window.

7. The method according to claim 1, further comprising:
  receiving signal strength data for each RFID tag in the stream; and
  determining the intended RFID tag from amongst the stream of RFID tags based upon the first positional data, the second positional data, and the signal strength data.

8. A scanning system for tag identification, the scanning system comprising:
  a radio-frequency identification (RFID) scanner configured to receive a stream of RFID tags, wherein each RFID tag is associated with a respective article;
  a first sensor attached to the RFID scanner and configured to generate first positional data, wherein the first positional data comprises first rotational data;
  a second sensor positioned separate from the first sensor and configured to generate second positional data, wherein the second positional data comprises second rotational data; and
  a computing device communicably coupled with the RFID scanner, the first sensor, and the second sensor and configured to:
    receive the stream of RFID tags;
    receive the first positional data from the first sensor;
    receive the second positional data from the second sensor;
    subtract the second rotational data from the first rotational data;
    determine a net rotation of the first sensor relative to the second sensor;
    determine a pick operation in an instance in which the net rotation satisfies a rotation threshold; and
    determine an intended RFID tag that corresponds with the pick operation.

9. The scanning system according to claim 8, wherein, in operation, the first sensor is positioned on a user's hand.

10. The scanning system according to claim 9, wherein, in operation, the second sensor is positioned on the user's torso.

11. The scanning system according to claim 10, wherein the first positional data comprises first rotational data associated with the user's hand, the second positional data comprises second rotational data associated with the user's torso, and the computing device is further configured to:
  determine the intended RFID tag from amongst the stream of RFID tags based upon the first positional data and the second positional data.

12. The scanning system according to claim 10, wherein the first positional data comprises first acceleration data associated with the user's hand, the second positional data comprises second acceleration data associated with the user's torso, and the computing device is further configured to:
  subtract the second acceleration data from the first acceleration data;
  determine a net acceleration of the first sensor relative to the second sensor;
  determine the pick operation in an instance in which the net acceleration satisfies an acceleration threshold; and
  determine the intended RFID tag that corresponds with the pick operation.

13. The scanning system according to claim 8, wherein each RFID tag in the stream further comprises tag time data, the first positional data comprises first time data, the second positional data comprises second time data, and the computing device is further configured to:
  generate an intended time window based upon the tag time data; and
  analyze the first positional data and the second positional data having first time data and second time data, respectively, within the intended time window.

14. The scanning system according to claim 8, wherein the computing device is further configured to:
  receive signal strength data for each RFID tag in the stream; and
  determine the intended RFID tag from amongst the stream of RFID tags based upon the first positional data, the second positional data, and the signal strength data.

15. A non-transitory computer-readable storage medium for using an apparatus to provide improved tag identification, the non-transitory computer-readable storage medium storing instructions that, when executed, cause the apparatus to:
  receive a stream of radio-frequency identification (RFID) tags, wherein each RFID tag is associated with a respective article;
  receive first positional data from a first sensor, wherein the first positional data comprises first rotational data;
  receive second positional data from a second sensor located separate from the first sensor, wherein the second positional data comprises second rotational data;
  subtract the second rotational data from the first rotational data;
  determine a net rotation of the first sensor relative to the second sensor;
  determine a pick operation in an instance in which the net rotation satisfies a rotation threshold; and
  determine an intended RFID tag that corresponds with the pick operation.

16. The non-transitory computer-readable storage medium according to claim 15, wherein, the first positional data is received from the first sensor on a user's hand, and the second positional data is received from the second sensor on the user's torso.

17. The non-transitory computer-readable storage medium according to claim 16, wherein the first positional data comprises first rotational data associated with the user's hand, the second positional data comprises second rotational data associated with the user's torso, and the non-transitory computer-readable storage medium stores instructions that, when executed, cause the apparatus to:
  determine the intended RFID tag from amongst the stream of RFID tags based upon the first positional data and the second positional data.

18. The non-transitory computer-readable storage medium according to claim 16, wherein the first positional data comprises first acceleration data associated with the user's hand, the second positional data comprises second acceleration data associated with the user's torso, and the non-transitory computer-readable storage medium stores instructions that, when executed, cause the apparatus to:
  subtract the second acceleration data from the first acceleration data;
  determine a net acceleration of the first sensor relative to the second sensor;

determine the pick operation in an instance in which the net acceleration satisfies an acceleration threshold; and determine the intended RFID tag that corresponds with the pick operation.

19. The non-transitory computer-readable storage medium according to claim 15, wherein each RFID tag in the stream further comprises tag time data, the first positional data comprises first time data, the second positional data comprises second time data, and the non-transitory computer-readable storage medium stores instructions that, when executed, cause the apparatus to:

generate an intended time window based upon the tag time data; and analyze the first positional data and the second positional data having first time data and second time data, respectively, within the intended time window.

20. The non-transitory computer-readable storage medium according to claim 15, wherein the non-transitory computer-readable storage medium stores instructions that, when executed, cause the apparatus to:

receive signal strength data for each RFID tag in the stream; and determine the intended RFID tag from amongst the stream of RFID tags based upon the first positional data, the second positional data, and the signal strength data.

* * * * *